Patented Jan. 7, 1941

2,228,154

UNITED STATES PATENT OFFICE 2,228,154

DRYING OIL AND PROCESS OF MAKING SAME

Remmet Priester, Deventer, Netherlands, assignor to N. V. Industrieele Maatschappij voorheen Noury & van der Lande, Deventer, Netherlands No Drawing. Application June 21, 1938, Serial No. 215,057. In the Netherlands June 26, 1937

12 Claims. (Cl. 134—56)

The present invention relates to the preparation of liquids, especially for paint and for impregnating agents by adding "Isano" oil to drying, semi-drying or non-drying vegetable oils or fish oils, tall oil (i. e. "tallol"), esterified or non-esterified, or the sulphurized, oxidized or polymerized products of the above mentioned oils, natural or artificial resins, waxes, high molecular hydrocarbons, among which also paraffine, low molecular hydrocarbons, such as varnish solvents and diluting agents as well as other varnish solvents and diluting agents which are not hydrocarbons, or mixtures of these substances; and heating the mixture to upwards of 150° C. The substances mentioned in this paragraph, for addition to "Isano" oil, are all common ingredients used in the manufacture of varnishes, and they all, when in a liquid condition, readily mix with the "Isano" oil. Many of these substances are liquids at ordinary room temperature, and most of the others melt to a liquid condition, at temperatures below those used in the present process.

An oil which occurs in the kernels of the nuts of "Ongokea Klaineane" a tree, which belongs to the family of the "Oleaceae" and which is very frequently found wild in tropical Africa and elsewhere, has been described in the literature, under the name of "Isano" oil (also called "Ongueka" oil). This tree has also been called "Ongokea Gore," "Ongueko des Mpongués, "Isano Loango," "Gore Pahouin."

The oil may be obtained from the kernels according to the usual methods, i. e., by pressing, solvent extraction, etc. It is a rather viscous, light yellow colored liquid, which externally shows much similarity with castor oil. About the composition of the oil little is known with certainty.

Although "Isano" oil was described in the literature during the 19th century, this oil has never found application in technics, which is indeed due to some very disagreeable properties of the oil, which made the working up of same practically impossible. The raw oil (despite statements in the literature to the contrary) seemingly has no drying properties, not even after adding a considerable quantity of driers; drying properties only come into existence after heating. The reaction taking place by heating such oil alone is, however exothermic to a high degree, so that the oil heats itself further, so that the temperature may increase to above 400° C. Therefore such experiments often finish with an explosion. If the reaction does not take place so vigorously because the oil has been most carefully heated, even then the temperature can not be kept under control, so that ordinarily a gelatinous product is formed or the oil is largely decomposed.

Applicant has now found a process according to which the above mentioned disagreeable phenomena are avoided and according to which products are formed with extraordinarily useful properties for varnish making. According to the invention "Isano" oil is mixed with one or more of the following materials: drying, semi-drying or non-drying vegtable or fish oils, tall oil, esterified or non-esterified, or the sulphurized, oxidized or polymerized products of these oils; natural or artificial resins, waxes, high molecular hydrocarbons, (including paraffine wax or paraffine oil), low molecular hydrocarbons such as varnish solvents and diluting agents, as well as other varnish solvents, and diluting agents of different composition or mixtures of these substances. Such mixtures may be heated to temperatures of about 300° C. without danger of excessive superheating by the exothermic reaction heat liberated. At the same time it was found, that the somewhat thickened oil formed in this way, has obtained very special varnish-technical properties. For example, by heating a mixture of linseed oil and "Isano" oil, a product is formed, the properties of which even highly surpass the linseed-oil-stand-oil. The heating of a semi-drying oil with "Isano" oil leads to a product which may be classified among the well drying oils, while even non-drying oils heated with "Isano" oil show film forming properties.

Resins, waxes and hydrocarbons treated with "Isano" oil in an analogous way at increased temperature also obtain better varnish-technical properties.

One can also subject mixtures of the above mentioned products or pretreated products such as stand-oil or blown (oxidized) oil, or sulphurized oil to the treatment with "Isano" oil.

The term sulphurized oil intends to comprise oils pretreated with sulphur or sulphur chloride, also described in literature under the name "sulphur treated oils."

The surprising feature is that the great improvement in varnish-technical properties is obtained not only by addition of considerable quantities of the "Isano" oil, but in the fact that small quantities such as about 20% have already a great effect.

My tests indicate that heating the mixture to temperatures below 150° C. does not lead to the desired result, the maximum temperature at which the heating can take place is greatly dependent on the percentage composition of the mixture, particularly on the percentage of "Isano" oil, which the mixture contains.

Generally one will use at most equal parts by weight of "Isano" oil and other products, a mixture of 20 parts of "Isano" oil and 80 parts of other products (of the kind mentioned above) giving already an important result. For illustration, by heating this 20:80 mixture for three hours at 250° C., the viscosity of 0.8 poise increases to 26.2 poises, whereas by such a treatment of the linseed oil alone, the viscosity can show an increase of at most 0.5 to 0.8 poise. The drying time of the mixture, after siccativation, is about thirty minutes, whereas linseed oil heated and siccativated in the same way, dries in about three hours.

A mixture of 40 parts of "Isano" oil and 60 parts of linseed oil (initially having a viscosity of 1.4 poises) after being heated for twenty minutes at 250° C. had a viscosity of 17.4 poises. If the heating of this mixture is continued another ten minutes at 250° C. it becomes gelatinized.

The heating of the mixture may be and (in many cases) preferably is carried out while conducting an inert gas such as, for example, carbon dioxide gas or nitrogen, through or over the oil being heated. This step can be carried out under normal pressure, superatmospheric pressure or under vacuum. The preparation under vacuum has the advantage, that the volatile substances formed, are carried away rapidly.

According to a special form of carrying out the process one can prepare a film of the mixtures mentioned above by simply spreading the "Isano" oil with one of the substances indicated, with or without a siccative, on objects, on which one wants to form the film and by heating these objects at a high temperature. For example, one can subject to a usual "stoving" treatment a mixture of six parts of linseed oil and four parts of "Isano" oil, which has been applied as a coating on tin, for two hours at 180° C. after which a film of a great hardness and extraordinary acid-resistance and alkali-resistance is obtained.

Still another form of carrying out the process is the heat treatment of "Isano" oil in a high boiling solvent. After having been heated for some hours the solvent may be distilled off at a reduced pressure and the pure heated "Isano" oil may be used as such or mixed with other media or impregnating agents. So, for example, one part of "Isano" oil and four parts of a petroleum fraction with a boiling point of 200°–300° C. may be heated under a reflux condenser. After boiling for two hours the petroleum fraction is distilled off under vacuum, during which distillation the temperature of the liquid remains under 150° C. The residue is a viscous oil, which shows very good drying properties.

The rapid polymerization (thickening) of "Isano" oil mixed with other substances, makes it possible to carry out this polymerization continuously. In this way a mixture of four parts of "Isano" oil and six parts of linseed oil, which is led through a heated tube in such a way that the oil becomes heated to apparently 240–260° C. and with such a velocity, that the oil is heated to this temperature about 20–25 minutes before the oil leaves the heated tube and is cooled in an externally cooled condenser tube, obtains a viscosity of about 17.4 poises (20° C.) Around the condenser tube fresh oil may be used in countercurrent to cool the heated oil and to be preheated itself. The product thus obtained dried very rapidly and the water resistance is such, that it is very suitable for boat varnishes. Naturally one may still add resins in order to accentuate the properties in a special direction.

It is also possible to first heat the linseed oil alone, (or the other additional substances) to the temperature at which one wants to treat the mixture, and to add the "Isano" oil thereto, whereby the above effects are produced.

For impregnating different materials such as, e. g. wood fibres and products containing wood fibres, artificial leather, electric cables and the like, the above mentioned products obtained with "Isano" and the pretreated "Isano" may be advantageously applied. Owing to the low acid number (which in case of very viscous products still lies under five) these products are particularly suitable for impregnating the insulating layers of electric cables and the like. Further possibilities of application, besides those mentioned, exist among others, in the linoleum industry and the oil cloth industry.

To prevent misunderstanding it may be stated, that in the prior literature and in connection therewith also in several textbooks, incorrect data are given as to the properties of "Isano" oil. For example in the well known textbook of Ubbelohde "Handbuch der Oele und Fette," 1920, II, page 343, and also in the second edition of the same textbook, 1932, part II, page 130, it is stated that "Isano" oil as such dries easily, and therefore may be used as a substitute for linseed oil. In opposition to this statement applicant has never found that untreated "Isano" oil has any drying properties. Similar incorrect information is found in Lewkowitsch "Chemical Technology and Analysis of Oils, Fats and Waxes," fifth edition (1914), vol. II, page 154.

The following examples illustrate how the process according to the present invention may be carried out in practice, but the invention is not restricted to these examples.

*Example I*

80 parts of linseed oil are heated at 250° C. with 20 parts of "Isano" oil for three hours. While the linseed oil by itself shows very little change at this temperature the viscosity of the mixture has risen from 0.8 poise (at 20° C.) to 26.2 poises. This is about the viscosity of a normal thick stand-oil. After siccativation, the product dries three times as fast as linseed oil alone. The water resistance and hardness of the film of the mixed oil are excellent and considerably better than those of a linseed oil film or of a linseed oil-stand-oil film obtained by drying a coating. The water resistance is comparable to a film consisting of 50 parts of linseed oil and 50 parts of Chinese wood oil.

*Example II*

70 parts of linseed oil are mixed with 30 parts of "Isano" oil and heated for one hour at 250° C. A product with a viscosity of 9.6 poises is obtained. The drying of this product is very rapid, the water resistance of the film is similar to that of a film obtained by drying a coating consisting of 75 parts of Chinese wood oil and 25 parts of linseed oil.

The same result may be attained if the mixture of "Isano" oil and linseed oil is heated for four hours at 225° C.

*Example III*

70 parts of soya bean oil and 30 parts of "Isano" oil are mixed together and this mixture is heated for one hour at 250° C. The viscosity has risen from 0.8 to 12.4 poises. After siccativation this oil dries more rapidly than linseed oil. The water resistance of the film is considerably better than that of films from linseed oil or linseed oil-stand-oil.

*Example IV*

A mixture of 8 parts of colophony is heated with two parts of "Isano" oil for three hours at 250° C. The product obtained, dissolved in turpentine substitute, gives (when spread on a surface and dried), a film which is only slightly tacky, whereas a solution of colophony in a volatile solvent, so spread, gives a highly tacky film. The water-resistance of a film produced by drying a coating of the heat-treated mixture produced in this example is much superior to the water-resistance of a film produced from the solution of colophony in a volatile solvent. If, in place of colophony in this example, a glycerin-colophony ester or other artificial resins, into which colophony esters can be worked up, are used, the films produced are much better than the films produced from the said colophony esters, in volatile solvents.

In comparing films, in the above examples, it is of course understood that films after drying, are being referred to.

I claim:

1. A process of producing a drying oil material from "Isano" oil, which comprises heating a mixture containing said oil and containing a varnish constituent which at the temperature of said heating is a liquid material miscible with said oil, to a temperature between about 150° C. and not considerably above 300° C., until drying properties are developed in said "Isano" oil.

2. A process of producing a drying material suitable as a varnish constituent which comprises heating "Isano" oil with a high boiling solvent for said oil to at least about 150° C., but not substantially above 300° C., and thereafter distilling off at least a major part of the solvent at a pressure substantially below atmospheric.

3. A process as claimed in claim 1, which comprises continuously passing the "Isano" oil while mixed with the said varnish constituent, through a heated zone.

4. A process which comprises heating an oil other than "Isano" oil, to a temperature above 150° C., at which said oil remains flowable, and adding "Isano" oil thereto, and maintaining the mixture in a heated state but at not substantially above 300° C. for a sufficient time to convert the "Isano" oil into a drying oil and to effect an increase in the viscosity of the mixture.

5. Process according to claim 1, characterized in bringing the unheated mixture of "Isano" oil and said varnish constituent into intimate contact with an object to be treated therewith, and heating said object carrying said oil mixture, to a temperature between about 150° and about 300° C.

6. A process which comprises subjecting "Isano" oil to a controlled heat treatment, while mixed with a diluent which at the temperature of said heating step is a liquid that is miscible with said oil, and which diluent remains a liquid at the maximum temperature attained by said mixture during said treatment, keeping the mixture at between about 150° C. and about 300° C., until drying properties are developed in said oil, and until said oil has become somewhat thickened, in addition to any thickening produced by admixture of said diluent with said oil, said heating being only to a temperature insufficient to destroy the drying properties produced in said oil.

7. A process which comprises subjecting "Isano" oil to a controlled heat treatment at a temperature between about 150° C., and about 300° C., while mixed with a diluent that is capable of moderating exothermic reactions, said diluent being one that is a liquid, miscible with said oil, at the temperature of said heat treatment.

8. A process which comprises subjecting a mixture of "Isano" oil with a diluent miscible therewith, to a heat treatment at between 150° C. and 300° C. until drying properties are developed in said "Isano" oil, said diluent being one that can be heated by itself to the maximum temperature to which the mixture is subjected during said heat treatment without largely or wholly evaporating and without excessively thickening or jellifying.

9. A process which comprises subjecting a mixture of "Isano" oil with a diluent miscible therewith, to a heat treatment at between 150° C. and 300° C. until drying properties are developed in said "Isano" oil, said diluent being one that is substantially stable and is a liquid at the maximum temperature attained by such mixture during said heat treatment.

10. A modified "Isano" oil material having drying properties, such product being that produced by the process of claim 1.

11. An oily material having drying properties and containing the heat-reaction products of "Isano" oil, said product being made by heat-treating "Isano" oil at between about 150° C. and about 300° C., while diluted with a diluent miscible therewith and which mixture remains a liquid during said heat-treating step, and such product being substantially free from such heat-reaction products as would be produced by carrying the heating to considerably above 300° C.

12. Industrial products containing as a substantial constituent, a drying oil formed by a moderated and controlled heat-treatment of "Isano" oil, in the presence of a diluent miscible therewith, at between about 150° C., and about 300° C.

REMMET PRIESTER.